United States Patent [19]
Plentovich et al.

[11] Patent Number: 4,770,032
[45] Date of Patent: Sep. 13, 1988

[54] POROUS PLUG FOR REDUCING ORIFICE INDUCED PRESSURE ERROR IN AIRFOILS

[75] Inventors: Elizabeth B. Plentovich, Grafton; Blair B. Gloss; John W. Eves, both of Newport News; John P. Stack, Yorktown, all of Va.

[73] Assignee: The United States of America as represented by the Administrator of the National Aeronautics and Space Administration, Washington, D.C.

[21] Appl. No.: 10,943

[22] Filed: Feb. 5, 1987

[51] Int. Cl.$^4$ .............................................. G01M 9/00
[52] U.S. Cl. ........................................ 73/147; 73/180
[58] Field of Search ............... 73/147, 179, 180, 182, 73/183, 178 R, 178 H, 178 T, 700

[56] References Cited

U.S. PATENT DOCUMENTS 2,448,966 9/1948 Fales ....................................... 73/147
3,327,529 6/1967 Bowles et al. ......................... 73/180
3,559,373 2/1971 Garrett ................................... 73/147

*Primary Examiner*—Donald O. Woodiel
*Attorney, Agent, or Firm*—George F. Helfrich; John R. Manning; Charles E. B. Glenn

[57] ABSTRACT

A porous plug (10) is provided for the reduction or elimination of positive error caused by orifice (20) during static pressure measurements of airfoil (14). The porous plug (10) is press fitted into orifice (20), thereby preventing error caused either by fluid flow (30) turning into the exposed orifice (20) or by fluid flow (30) stagnating at the downstream edge (21) of orifice (20). In addition, porous plug (10) is flushed with the outer surface of airfoil (14), as by filing and polishing, to provide a smooth surface which alleviates error caused by imperfections in orifice (20). Porous plug (10) is preferably made of sintered metal, which allows air to pass through the pores, so that static pressure measurements can be made by remote transducers (not shown).

8 Claims, 4 Drawing Sheets

POROUS PLUG FOR REDUCING ORIFICE INDUCED PRESSURE ERROR IN AIRFOILS

ORIGIN OF THE INVENTION

The invention described herein was made by employees of the U.S. Government and may be manufactured and used by or for the Government for governmental purposes without the payment of any royalties thereon or therefor.

TECHNICAL FIELD OF THE INVENTION

This invention relates to airfoil testing and more specifically to a device for reducing orifice induced pressure error during static pressure measurements of airfoils.

BACKGROUND OF THE INVENTION

Static pressure measurement is one of several tests routinely performed on airfoils in a wind tunnel. For a conventional open orifice, three effects combine to produce orifice induced pressure error. First, fluid flow turns into the exposed orifice. Second, fluid flow stagnates at the downstream edge of the orifice to produce a pitot effect. These two effects generally combine to provide a static pressure measurement which is too high; i.e., positive error. Third, orifice imperfections result in further positive error. Examples of orifice imperfections include an orifice which is out-of-round or has burrs, chamfering, a particle lodged inside, or a longitudinal axis which is not normal to the model surface.

To avoid the error resulting from orifice imperfections, conventional orifices must be carefully drilled normal to the airfoil surface. The orifices must be perfectly round, square edged, and clean.

Also, in order for the effects of orifice induced pressure error to be acceptably small at high Reynolds numbers and cryogenic temperatures, the orifices must have a small diameter (e.g., 0.010 inches). The fabricating of such small orifices with no imperfections requires much time, and therefore is very costly. In addition, the airfoil must be carefully handled after fabrication to avoid subsequent clogging of the orifices.

Accordingly, it is an object of this invention to reduce significantly or eliminate orifice induced pressure error during static pressure measurements of an airfoil.

It is a further object of this invention to reduce or eliminate orifice induced pressure error in an expeditious and inexpensive manner.

It is a further object of this invention to achieve the foregoing objects during high Reynolds number testing at cryogenic temperatures.

Other objects and advantages of this invention will become apparent hereinafter in the specification and drawings which follow.

SUMMARY OF THE INVENTION

According to the present invention, the foregoing and additional objects are obtained by providing a porous plug which is securely fitted into a static pressure orifice. The presence of the plug prevents fluid flow from either turning into the orifice or stagnating at the downstream edge of the orifice. Also, the presence of pores allows air to pass through the plug, enabling transducers to record the pressure of the fluid flow with no appreciable reduction of the flow. In addition, the porous plug is flushed with the outer surface of the airfoil. This flushing smooths the outer surface of the airfoil, thereby significantly reducing if not eliminating error caused by orifice imperfections.

DETAILED DESCRIPTION OF THE INVENTION

Figure 1A:
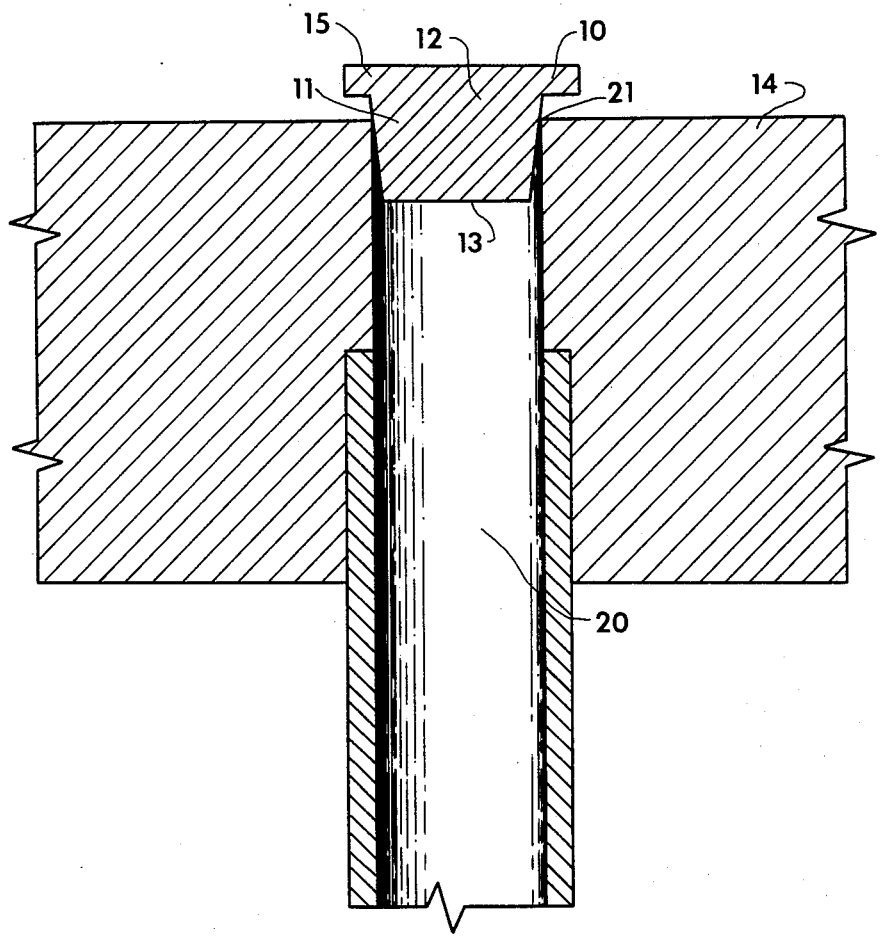
FIG. 1A is a side view of a porous plug and orifice before press fitting and flushing, according to the present invention.
Figure 2:
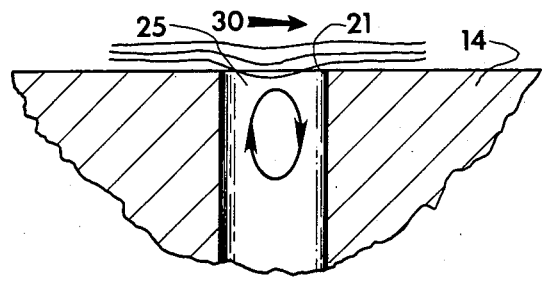
FIG. 2 is a side view of a conventional orifice.

As illustrated in FIG. 1A, a porous plug 10 is provided to reduce significantly or eliminate error in static pressure measurements of airfoil 14 caused by orifice 20. Referring now to FIG. 2, fluid flow 30 proceeds along the outer surface of airfoil 14 until coming into contact with exposed conventional orifice 25. Three effects then combine to produce orifice induced pressure error. First, flow 30 turns into the exposed orifice 25. Second, flow 30 stagnates at the downstream edge 21 of orifice 25 to produce a pitot effect. These two effects generally combine to provide a static pressure measurement recorded by pressure transducers (not shown) which is too high, i.e., positive error. Third, imperfections of orifice 25 result in further positive error. Examples of orifice imperfections include an orifice 25 which is out of round or has burrs, chamfering, a particle lodged inside, or a longitudinal axis which is not normal to the outer surface of airfoil 14.

Referring once again to FIG. 1A, an example of the use of a porous plug 10 to reduce significantly or eliminate positive error caused by orifice 20 is shown. In this embodiment, orifice 20 has a diameter of 0.040 inches. Porous plug 10 is shown to have a machine tapered cylinder 11. The larger end 12 has a diameter of 0.042 inches and the smaller end 13 has a diameter of 0.039 inches. Porous plug 10 is then manually press fitted into orifice 20, with small end 13 first entering orifice 20. A tight fit is achieved by this press fitting.

Figure 1B:
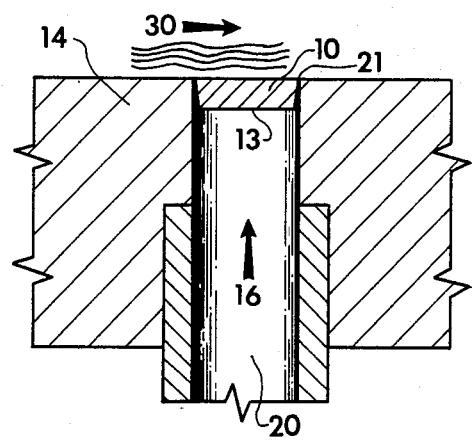
FIG. 1B is a side view of a porous plug and orifice after press fitting and flushing, according to the present invention.

Referring now to FIG. 1B along with FIG. 1A, after porous plug 10 is press fitted into the end of orifice 20 at the outer surface of airfoil 14, the part of tapered cylinder 11 and the remainder 15 of porous plug 10 which extend outside of orifice 20 are then flushed with the outer surface of airfoil 14 by filing and polishing. Also, filtered air 16 is blown through the open end of orifice 20 during this filing and polishing to keep the porous material open for the passage of air during subsequent static pressure measurements. After this flushing process, the amount of porous plug 10 inserted in orifice 20 ranges from 0.040 inches to 0.045 inches.

Accordingly, this inserted porous plug 10 significantly reduces or eliminates positive error caused by orifice 20. The presence of porous plug 10 in orifice 20 prevents fluid flow 30 from turning into the previously exposed orifice 20. Also, the presence of porous plug 10 in orifice 20 prevents a pitot effect from developing, since flow 30 cannot stagnate at covered downstream edge 21. Finally, the presence of flushed porous plug 10 in orifice 20 smooths the outer surface of airfoil 14, thereby eliminating the various mechanisms which induce error in imperfect orifices.

Porous plug 10 is preferably constructed of sintered metal. This use of sintered metal causes a reduction of approximately fifteen percent in the flow of air through orifice 20 at room temperature, as compared to an open conventional orifice 25. This is an acceptable amount of reduction. Also, no further reduction in air flow is observed at cryogenic temperatures. Thus, pressure may be transmitted via orifice 20 to remote transducers (not shown) for static pressure measurements. Also, porous plug 10 remains flush with the outer surface of airfoil 14 at cryogenic temperatures, if porous plug 10 is comprised of a metal which has thermal expansive and compressive properties which are equivalent to the metal comprising airfoil 14. Accordingly, a porous plug 10 composed of sintered metal is appropriate for use during testing at cryogenic temperatures.

Figure 3:
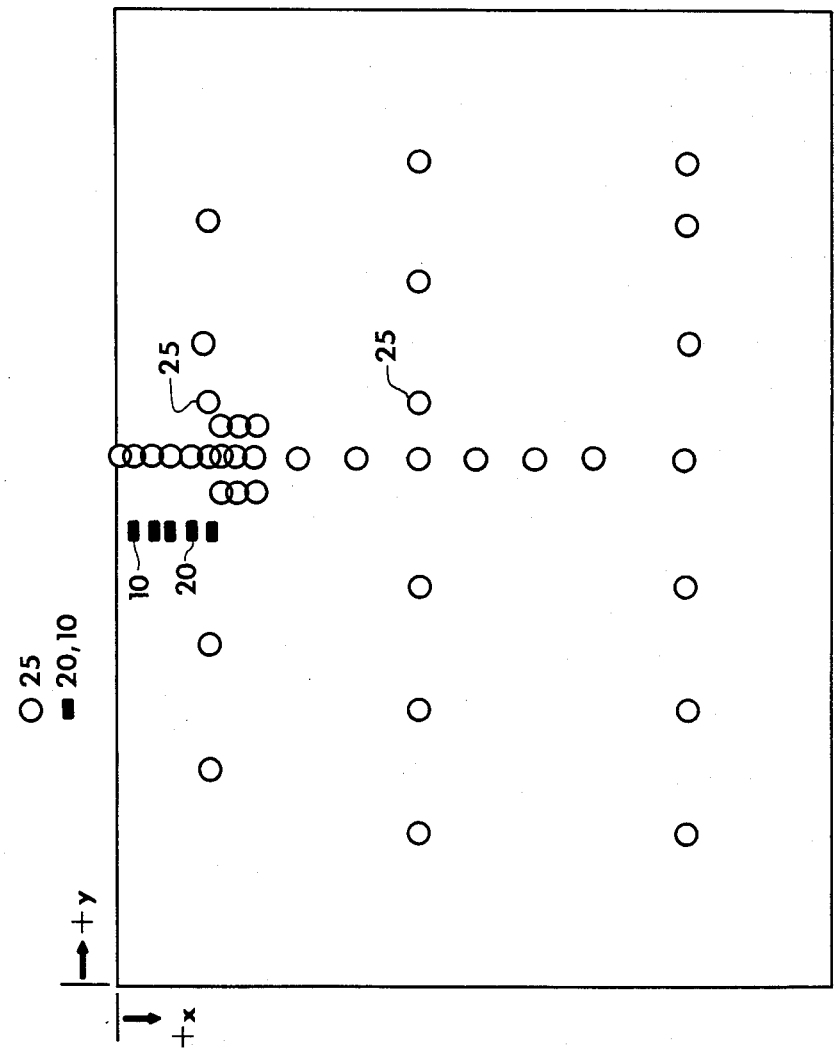
FIG. 3 is a top view of an airfoil fitted with conventional orifices and orifices with porous plugs according to the present invention.
Figure 4A:
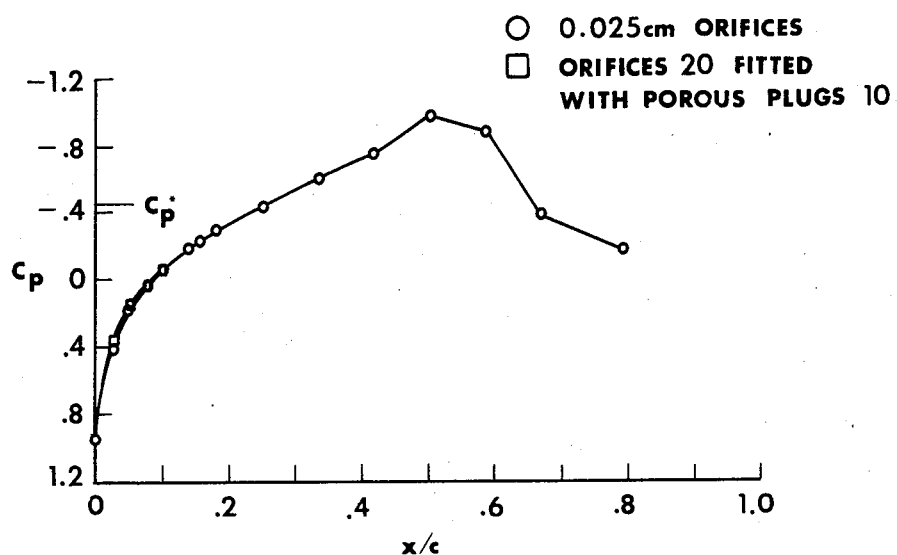
FIG. 4A is a graph of the effect of conventional orifices and orifices with porous plugs on pressure distribution at $M=0.80$, $Rc=40\times10^6$, and $a=1°$.
Figure 4B:
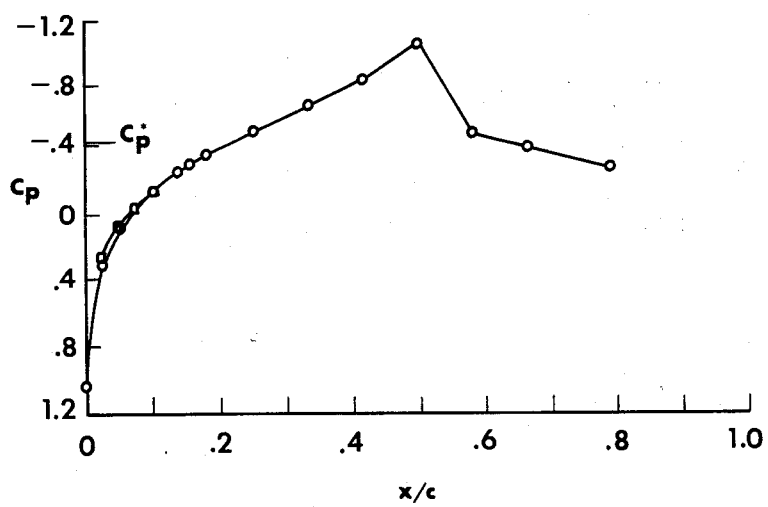
FIG. 4B is a graph of the effect of conventional orifices and orifices with porous plugs on pressure distribution at $M=0.80$, $R_c=40\times10^6$, and $a=0°$.

Referring now to FIG. 3, an airfoil 14 was fitted with conventional orifices 25 and orifices 20 with inserted and flushed porous plugs 10. Since the airfoil 14 was to be subjected to the thinner boundary layers caused by high Reynolds numbers approaching $4 \times 10^7$, the conventional orifices 25 were to be of a very small size, in order for the orifice induced pressure error to be acceptably low. Accordingly, the standard diameter of 0.010 inches was used for conventional orifices 25. As noted above, the orifices 20 fitted with porous plugs 10 have a diameter of 0.040 inches. The results of testing at high Reynolds numbers are shown in FIGS. 4A and 4B. Referring now to these figures, it is clearly shown that orifices 20 fitted with porous plugs 10 provide a more negative value of $C_p$ than do the conventional orifices 25. This more negative value of $C_p$ indicates that a more accurate static pressure measurement is achieved by orifices 20 fitted with porous plugs 10. Accordingly, the use of orifices 20 fitted with porous plugs 10 represents an improvement over conventional orifices 25. Also, the larger orifices 20 (0.040 inches) are fabricated more easily than the significantly smaller conventional orifices 25 (0.010 inches). This easier fabrication results in a quicker and more economical installation of orifices 20 in an airfoil 14. Finally, imperfections in this fabrication are alleviated by the smooth surface provided by flushed, filed, and polished porous plug 10.

What is claimed is:

1. A device for significantly reducing or eliminating orifice induced error during static pressure measurements of an airfoil comprising:

a porous plug secured in a test orifice of the airfoil such that said porous plug completely fills said orifice at the outer surface of said airfoil and said porous plug is not positioned completely inside said orifice;

said secured porous plug is flushed with the outer surface of said airfoil.

2. The device of claim 1 wherein said porous plug is comprised of sintered metal.

3. The device of claim 1 wherein said porous plug comprises a tapered cylinder having a larger end which has a diameter greater than or equal to the diameter of said orifice and a smaller end which has a diameter less than the diameter of said orifice and wherein said small end of said tapered cylinder is placed into said orifice.

4. The device of claim 1 wherein said porous plug is comprised of a metal which has thermal expansive and compressive properties which are equivalent to those of said airfoil, thereby allowing the device to be used at cryogenic temperatures.

5. A process for significantly reducing or eliminating orifice induced error during static pressure measurements of an airfoil comprising:

securing a porous plug into a test orifice of the airfoil such that said porous plug completely fills said orifice at the outer surface of said airfoil and said porous plug is not positioned completely inside said orifice;

flushing said secured porous plug with the outer surface of said airfoil.

6. The process of claim 5 wherein said securing is manual press fitting.

7. The process of claim 5 wherein said flushing is filing and polishing.

8. The process of claim 7 wherein filtered air is blown through said orifice during said filing and polishing to keep said porous plug open for the passage of air during subsequent static pressure measurements.

* * * * *